United States Patent
Orton

(10) Patent No.: US 6,438,555 B1
(45) Date of Patent: Aug. 20, 2002

(54) METHOD AND APPARATUS FOR ACCESSING AN ORDERED ARRAY STRUCTURE

(75) Inventor: Scott L. Orton, Allen, TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/431,994

(22) Filed: Nov. 2, 1999

(51) Int. Cl.[7] .............................................. G06F 17/30
(52) U.S. Cl. ...................... 707/100; 707/2; 707/104.1; 709/201; 709/227
(58) Field of Search .................... 707/100, 2, 104.1; 709/201, 227

(56) References Cited

U.S. PATENT DOCUMENTS

| | | | | |
|---|---|---|---|---|
| 5,684,945 A | * | 11/1997 | Chen et al. .................... 714/20 |
| 5,806,068 A | * | 9/1998 | Shaw et al. ................... 707/103 |
| 5,887,183 A | * | 3/1999 | Agarwal et al. ................ 712/2 |
| 6,226,267 B1 | * | 5/2001 | Spinney et al. .............. 370/235 |
| 6,295,575 B1 | * | 9/2001 | Blumenau et al. .............. 711/5 |
| 6,301,609 B1 | * | 10/2001 | Aravamudan et al. ....... 709/207 |

OTHER PUBLICATIONS

Handley, M.; SIP: Session Initiation Protocol; Mar. 1999; pp. 1–134.

* cited by examiner

Primary Examiner—John Breene
Assistant Examiner—Cheryl Lewis

(57) ABSTRACT

A method and apparatus in a data processing system for managing data elements from a data packet. The data packet are received including a plurality of data elements, wherein the plurality of data packets has a plurality of types. The plurality of data elements are placed into a first array, wherein the plurality of data elements are associated with a plurality of identifiers identifying a location of the plurality of data elements in the first data structure. The plurality of identifiers are stored in a plurality of data structures, wherein each data structure within the plurality of data structures stores identifiers of a same type.

41 Claims, 10 Drawing Sheets

FIG. 4

```
general-header  = Accept
                | Accept-Encoding
                | Accept-Language
                | Call-ID
                | Contact
                | CSeq
                | Date                      } 400
                | Encryption
                | Expires
                | From
                | Record-Route
                | Timestamp
                | To
                | Via
entity-header   = Content-Encoding
                | Content-Length            } 402
                | Content-Type
request-header  = Authorization
                | Contact
                | Hide
                | Max-Forwards
                | Organization
                | Priority
                | Proxy-Authorization       } 404
                | Proxy-Require
                | Route
                | Require
                | Response-Key
                | Subject
                | User-Agent
response-header = Allow
                | Proxy-Authenticate
                | Retry-After
                | Server                    } 406
                | Unsupported
                | Warning
                | WWW-Authenticate
```

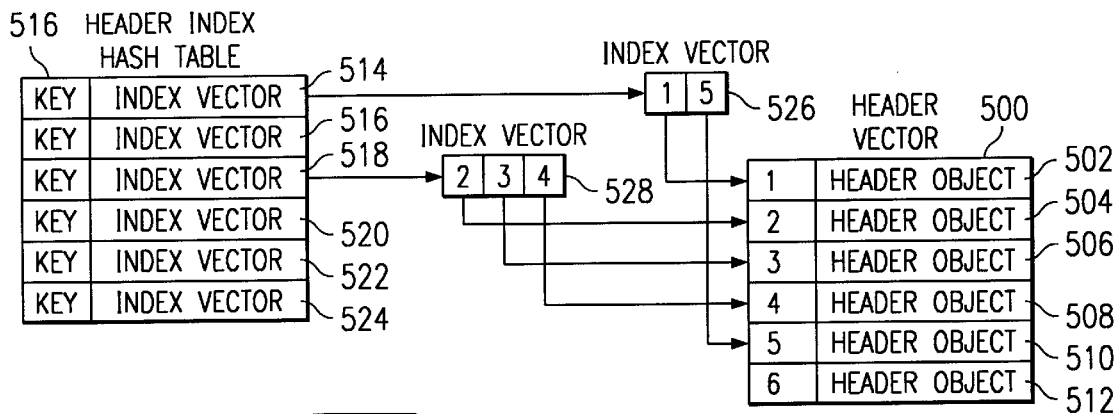
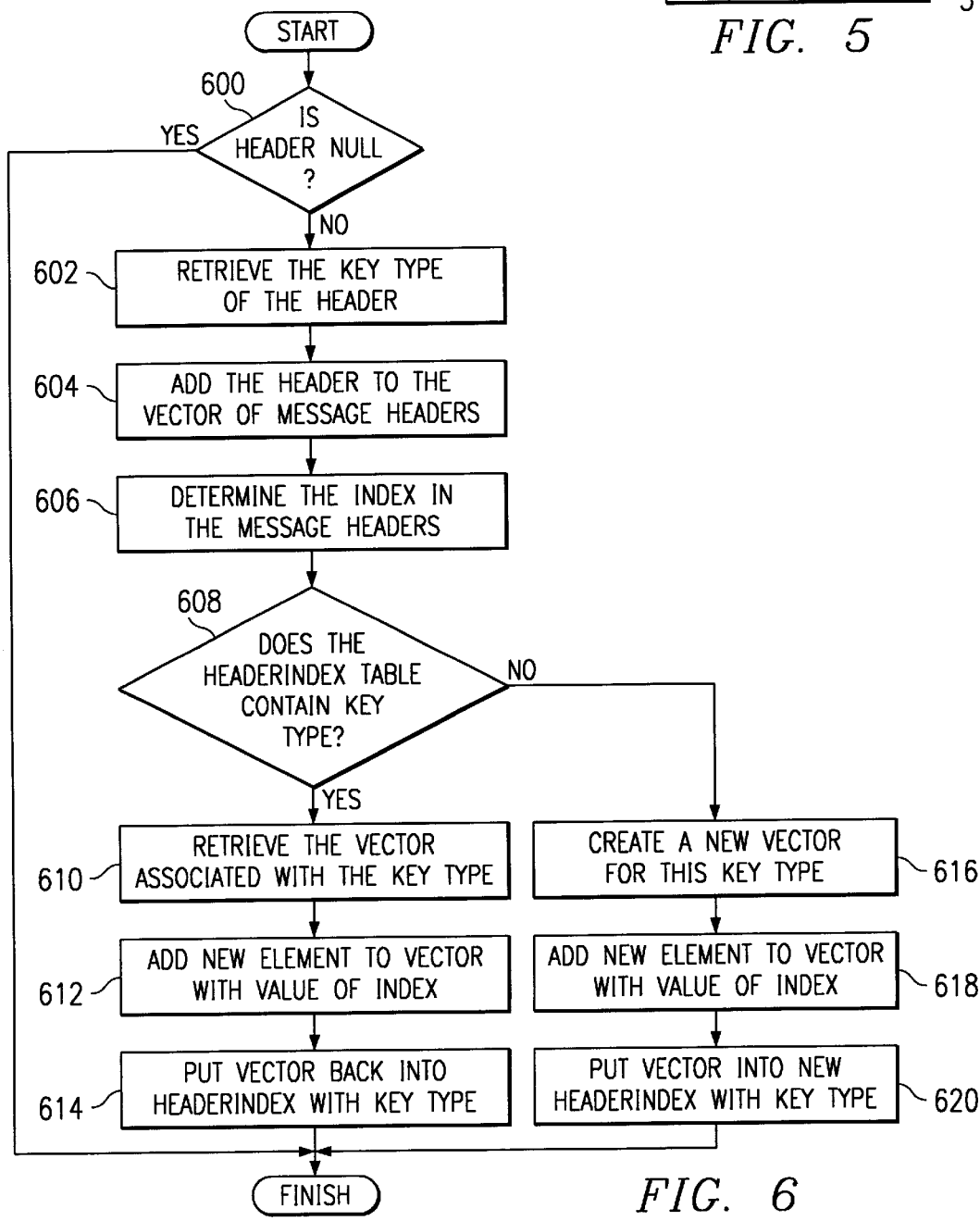
FIG. 5
FIG. 6

FIG. 12A

```
public void addHeader(SipHeader header)
{
    // add the new element to the vector then determine if it has a entry
    // in the headerIndex and either update or create it.
    if (header == null)
        return;
    String headerType = header.getFieldType() .toLowerCase() ;
    msgHeaders.addElement (header) ;
    int index = msgHeaders.size () -1;

// First check to see if the header already has an entry in the vector.
    if (headerIndex.containsKey (headerType))
    {
        Vector temp = (Vector) headerIndex.get (headerType) ;
        // add the new element to the vector
        temp.addElement (new Integer (index)) ;
        headerIndex.put (headerType,temp) ;
    }
    else
    {
        // create a new vector to store the indices in.
        Vector temp = new Vector (5) ;
        temp.addElement (new Integer (index)) ;
        headerIndex.put (headerType.toLowerCase () ,temp) ;
    }
} public Hashtable getHeaderIndex() {return headerIndex; }
public Vector getMsgHeaders() { return msgHeaders; }

```
 * @returns The first header of the type specified The type is the key
to the header index hashtable
    */
   public SipHeader getHeader (String headerType)
   {
       try {
           Vector tempIndices = (Vector) headerIndex.get (
                                       headerType.toLowerCase () ) ;
           //There should only realy be one to header
           if (tempIndices == null)
               return null;
           Integer index = (Integer) tempIndices.firstElement () ;
           return (SipHeader) msgHeaders.elementAt (index.intValue () ) ;
       }
       catch (Exception e) {
           // We had trouble with either firstElement () or elementAt ()
           System.err.println ("An error in getHeader(s) with
"+headerType) ;
           return null;
       }
   }
```

```
void recalculateHeaderIndex()
{
    // this method recalculates all of the information stored
    // in the headerIndex hashTable.
    Hashtable newHeaderIndex = new Hashtable (37,0.5f) ;
    for (int i = 0;i<msgHeaders.size () ;i++)
    {
        Integer current = new Integer (i) ;
        SipHeader currHeader = (SipHeader) msgHeaders.elementAt (i) ;
        String fieldName = currHeader.getFieldType () .toLowerCase () ;
        if (newHeaderIndex.containsKey (fieldName))
        {
            Vector temp = (Vector) newHeaderIndex.get (fieldName) ;
            // add the new element to the vector
            temp.addElement (newInteger (i)) ;
            newHeaderIndex.put (fieldName,temp) ;
        }
        else
        {
            //create a new vector to store the indices in.
            Vector temp = new Vector (5) ;
            temp.addElement(newInteger (i)) ;
            newHeaderIndex.put (fieldName,temp) ;
        }
    }//for loop
    headerIndex = newHeaderIndex;

} // recalculateHeader
```
⎫
⎬ 1204
⎭

```
public Vector getAllHeadersofType (String headerType)
{
    Vector retVector = new Vector () ;
    Vector tempIndices = (Vector) headerIndex.get (headerType.toLowerCase ()) ;
    if (tempIndices == null)
        return null;
    for (int i=0;i<tempIndices.size() ;i++)
    {
        Integer tempInt = (Integer) tempIndices.elementAt (i) ;
        retVector.addElement (msgHeaders.elementAt (tempInt.intValue ())) ;
    }
    return retVector;
}
```
⎫
⎬ 1206
⎭

FIG. 12D

```
public void addHeadersToBeginingof header list (Header h, String headerType)
{
    Vector tempIndices = (Vector) headerIndex.get (headerType) ;
    if (tempIndices == null)
    {
        // this is the first viaheader
        addHeader(h) ;
    }
    else
    {
        Integer first = (Integer) viaIndices.firstElement () ;
        msgHeaders.insertElementAt (h,first.intValue ()) ;
        recalculateHeaderIndex () ;
    }
} // updateViaHeaders
```
⎬ 1208

```
public void removeFirstHeaderOfType (String hType)
{
    Vector tempIndices = (Vector) headerIndex.get (hType) ;
    Integer index = (Integer) tempIndices.firstElement () ;
    Header temp = (Header) msgHeaders.elementAt (index.intValue ()) ;
    if (temp.removeFirstEntry ())
    {
        msgHeaders.removeElementAt (index.intValue ()) ;
        recalculateHeaderIndex () ;
    }
}
```
⎬ 1210

METHOD AND APPARATUS FOR ACCESSING AN ORDERED ARRAY STRUCTURE

FIELD OF THE INVENTION

The present invention relates generally to an improved communications system and in particular to a method and apparatus for managing message content. Still more particularly, the present invention provides a method and apparatus for handling information from a Session Initiation Protocol message.

BACKGROUND OF THE INVENTION

Session Initiation Protocol (SIP) is an application-layer control (signaling) protocol for creating, modifying and terminating sessions with one or more participants. These sessions include Internet multimedia conferences, Internet telephone calls and multimedia distribution. Members in a session can communicate via multicast or via a mesh of unicast relations, or a combination of these.

SIP invitations used to create sessions carry session descriptions, which allow participants to agree on a set of compatible media types. SIP supports user mobility by proxying and redirecting requests to the user's current location. Users can register their current location. SIP is not tied to any particular conference control protocol. SIP is designed to be independent of the lower-layer transport protocol and can be extended with additional capabilities.

SIP can be used to initiate sessions as well as invite members to sessions that have been advertised and established by other means. Sessions can be advertised using multicast protocols such as SAP, electronic mail, news groups, Web pages or directories (LDAP), among others.

SIP transparently supports name mapping and redirection services, allowing the implementation of ISDN and Intelligent Network telephony subscriber services. These facilities also enable personal mobility. Personal mobility is the ability of end users to originate and receive calls and access subscribed telecommunication services on any terminal in any location, and the ability of the network to identify end users as they move. Personal mobility is based on the use of a unique personal identity (i.e. personal number. Personal mobility complements terminal mobility, such as the ability to maintain communications when moving a single end system from one subnet to another. SIP supports five facets of establishing and terminating multimedia communications: (1) user location: determination of the end system to be used for communication; (2) user capabilities: determination of the media and media parameters to be used; (3) user availability: determination of the willingness of the called party to engage in communications; (4) call setup: "ringing", establishment of call parameters at both called and calling party; and (5) call handling: including transfer and termination of calls.

SIP is a text based protocol and uses the ISO 10646 character set in UTF-8 encoding. A SIP message is either a request from a client to a server or a response from a server to a client. Both of these types of messages contain a start line, one or more header fields, an empty line indicating the end of the header fields, and an optional message body. These header fields are also referred to as "headers". In processing a SIP message, different SIP message headers have different characteristics with respect to the frequency of occurrence in SIP messages. Some headers, such as, for example, a "To" header is a general header that appears only once while other header, such as, for example, a "Via" header is a general header that can appear any number of times. Presently, these headers are stored in data structures, such as an array as they are parsed out of the message. Such a storage mechanism is inefficient. The execution of SIP logic in some cases requires selected headers or all headers of a particular type to be located. Scanning an entire array to find required headers is inefficient, especially when headers may be required numerous times during processing of a message.

Therefore, it would be advantageous to have a method and apparatus for locating information parsed from a message.

SUMMARY OF THE INVENTION

The present invention provides an improved method, apparatus, and instructions for storing and locating information parsed from a message. The mechanism provided for storing and locating information reduces the amount of resources needed to locate information at a later time. Headers parsed from a message are stored in a vector. This vector is also referred to as a header vector and headers are stored in the vector in the order that the headers are parsed from the message. A header hash table is created. This hash table contains a unique key for each type of header. This hash table is indexed by a string representation of the header type in these examples. The value of each entry in the header hash table is a vector in which the integer indices for entries in the header vector are stored. Thus, to extract or identify all message headers of a selected type, the key associated with the type is used to identify a hash table entry containing an index vector. This index vector contains identifiers or integer indices to all of the entries in the header vector containing the selected type of message header. The indices in the index vector are used to locate headers of the same type without having to search the entire header vector.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a diagram illustrating headers processed by the processes of the present invention are illustrated;

FIG. 5 is a diagram illustrating storing and accessing of header information parsed from SIP messages depicted in accordance with a preferred embodiment of the present invention;

FIG. 6 is a flowchart showing the adding of a new message header to the header index table depicted in accordance with a preferred embodiment of the present invention;

FIGS. 12A–12D is a diagram of code for processing headers and SIP messages depicted in accordance with a preferred embodiment of the present invention.

DETAILED DESCRIPTION OF THE PREFERRED EMBODIMENT

Figure 1:
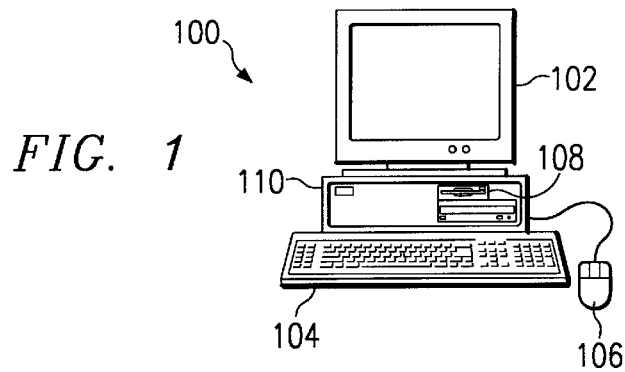
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
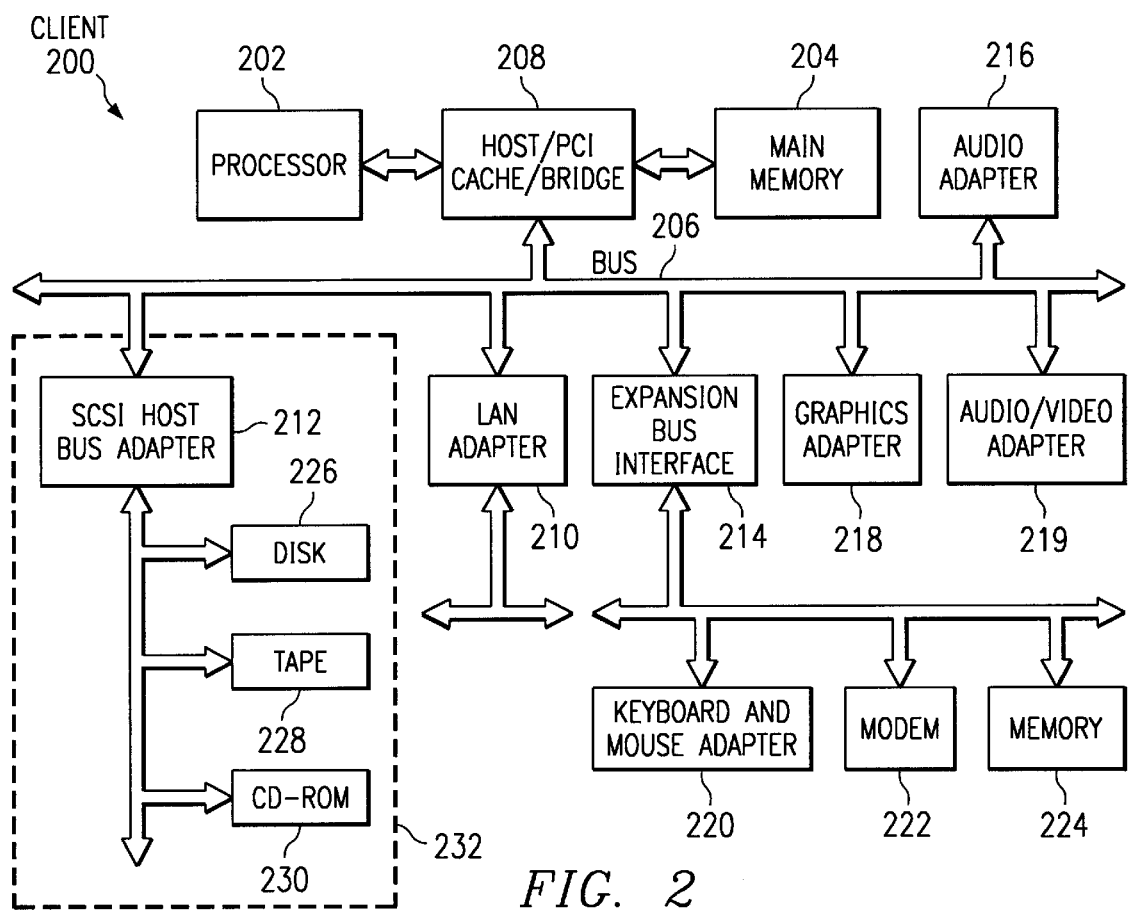
FIG. 2 is a block diagram of a data processing system in which the present invention may be implemented.

With reference now to FIG. 2, a block diagram illustrates a data processing system in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device or a set-top device in a home.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

Data processing system 200 in these examples includes software that establish sessions using SIP. A session may be established with another data processing system, for example, to set up a session for a conference call. Also, the software may receive and exchanges SIP messages with a source, such as a proxy server, to setup a session. The session may involve, for example, a telephone call or a video The present invention provides a method, apparatus, and instructions for processing and storing data elements from a message or other data structure. The present invention stores incoming headers in a simple vector. In the depicted examples, these processes may be implemented in application or program using SIP to establish a session. This vector is also referred to as a header vector and headers are stored in the vector in the order that the headers are parsed from the message. A header hash table is also created. This hash table contains a unique key for each type of header. This hash table is indexed by a string representation of the header type in these examples. The value of each entry in the header hash table is a vector. These vectors are index vectors in which the integer indices for the header vector are stored. Thus, to extract or identify all message headers of a selected type, the key associated with the type is used to identify a hash table entry containing an index vector. This index vector contains identifiers or integer indices to all of the entries in the header vector containing the selected type of message header.

Figure 3:
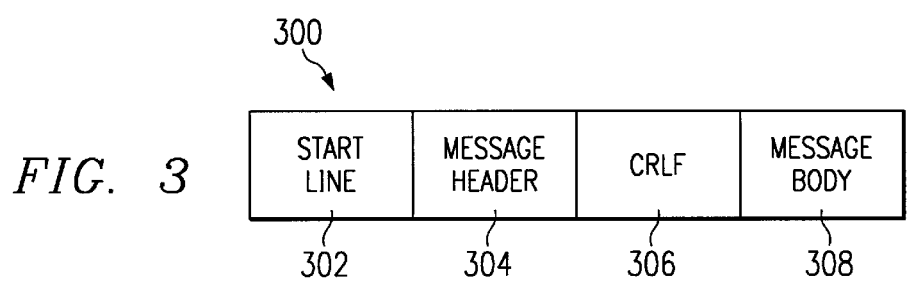
FIG. 3 is a diagram of a SIP message depicted in accordance with a preferred embodiment of the present invention.

Turning now to FIG. 3, a diagram of a SIP message is depicted in accordance with a preferred embodiment of the present invention. SIP message 300 starts with a start line 302 followed by header section 304. Header section 304 may contain one or more headers. A carriage-return line-feed (CRLF) 306 delineates the end of message header section 304. Message body section 308 follows CRLF 306 and is an optional section in SIP. In FIG. 4, a diagram illustrating headers processed by the processes of the present invention are illustrated. Examples of general headers are found in section 400, with entity headers in section 402. Specific headers for request SIP messages are found in section 404 while specific headers for response SIP messages are found in section 406. The headers in these sections are examples of headers that are parsed from head sections in SIP messages and stored and accessed using the processes of the present invention. More information on SIP can be found in "SIP: Session Initiation Protocol", IETF RFC 2543, http://ietf.org/rfc/rfc2543.txt, March 1999.

Turning next to FIG. 5, a diagram illustrating storing and accessing of header information parsed from SIP messages is depicted in accordance with a preferred embodiment of the present invention. As a SIP message is parsed, such as SIP message 300 in FIG. 3, headers are placed in a header vector 500 in the order in which they encountered. Header vector 500 contains a number of entries, such as entries 502–512. Each entry includes an integer index and a header object in these examples. In this example, six header objects are present within header vector 500 and these header objects are indexed using indexes 1–6. The header object is a header from the SIP message. As each header is placed into header vector 500, the index is placed in an index vector, such as index vector 521 or 528. This index vector is stored in the header index has table 516. The key of header index hash table 516 is the type of header object to which the indexes in the index vector refer to. Thus, each index vector may grow as a SIP message is parsed. In this example, header index hash table 516 contains entries 514–524. Each entry in header index hash table 516 contains a key that is unique and associated with a particular type of header along with an index vector. Index vectors 526 and 528 are examples of index vectors found in header index hash table 516. For example, index vector 526 is found in entry 514, while index vector 528 is found in entry 518.

When the header object in entry 502 is placed in header vector 500, the integer index, which is 1, is placed into index vector 526. Index vector 526 is an index vector for entry 514. The next three entries, 504–508, in header vector 500 contain the same type of header. The integer indexes, 2–4, are placed into index vector 528, which is the index vector for entry 518. The fifth entry parsed from the SIP message and placed into entry 510 in header vector 500 is of the same type as the header in entry 502. The integer index, 5, is added to index vector 528. Additional initial processing occurs in creating these vectors and tables, but processing resources are saved during SIP functions that require headers.

When a particular header type is required, the key for the header type is used to identify an entry in header index hash table 516. This entry contains an index vector with indices to all of the headers of the same type in header vector 500. Thus, a search for a particular type of header does not require a search of the entire header vector. In the depicted examples, a header vector 500 and a header index hash table 516 is created for each SIP message received.

With reference now to FIG. 6, a flowchart showing the adding of a new message header to the header index table is depicted in accordance with a preferred embodiment of the present invention. The process begins by determining if the message header is empty (step 600). If the message header is empty, then the routine is immediately exited. Otherwise, the key type for that message header is retrieved (step 602). This new message header is added to the vector of message headers (step 604) and its index location is identified and saved (step 606).

Next, a determination is made as to whether the header index table contains a key type associated with a vector (step 608). If the hash table contains a vector associated with that key type, the vector is retrieved (step 610). The value of the index is added at the end of the vector (step 612), and the modified vector is put back into the header index table (step 614) with the process terminating thereafter.

With reference again to step 608, if no vector exists for the key type, then a new vector is created for this key type (step 616). The index value is put into the vector as its first element (step 618), and the new vector is put back into the header index table (step 620) with the process terminating thereafter. The insertion of the new message header is complete at this time.

Figures 7, 9:
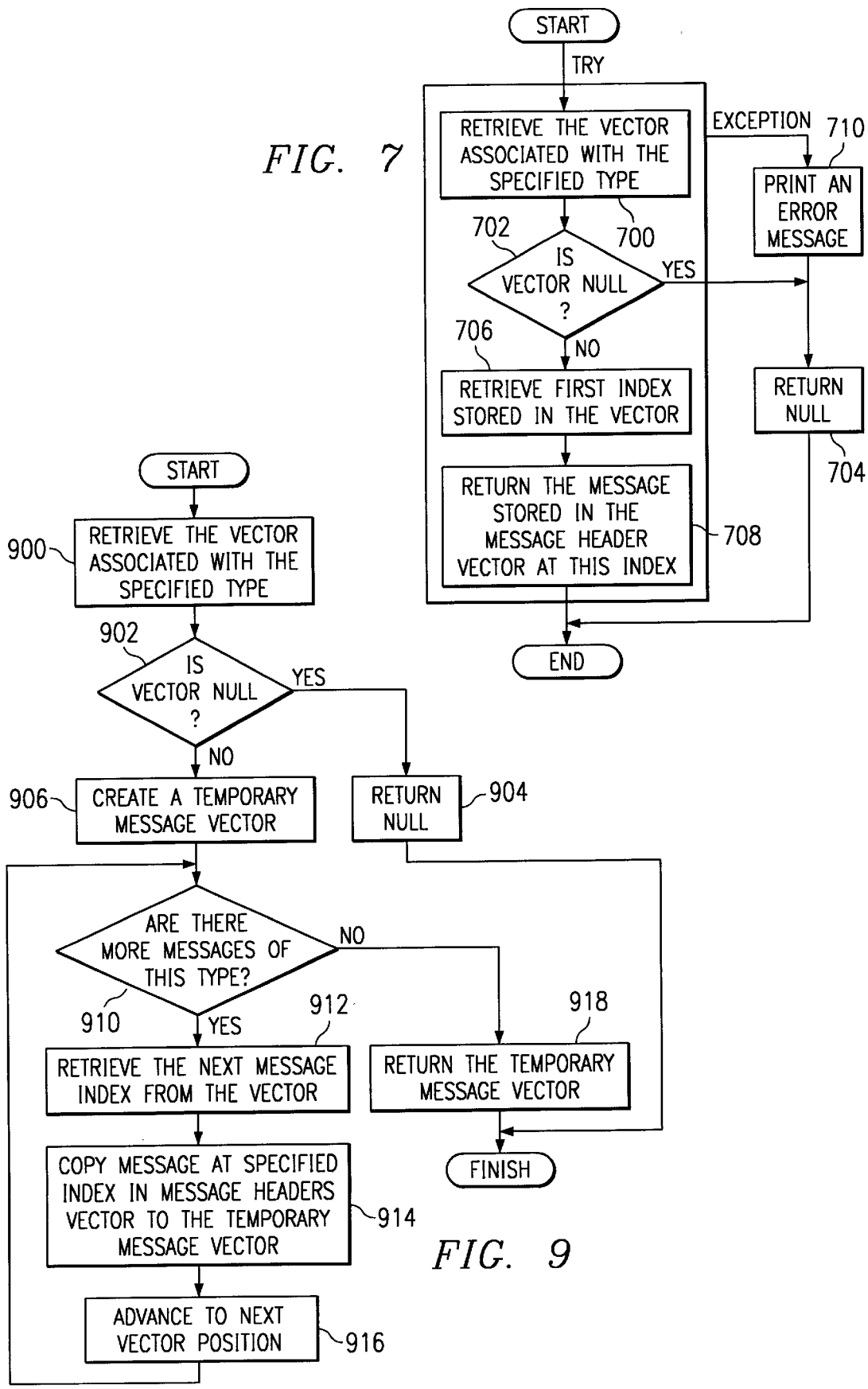
FIG. 7 is a flowchart showing the retrieval of the first message header associated with a specified key type depicted in accordance with a preferred embodiment of the present invention.
FIG. 9 is a flowchart showing the retrieval of all message headers associated with a specified key type depicted in accordance with a preferred embodiment of the present invention.

With reference now to FIG. 7, a flowchart showing the retrieval of the first message header associated with a specified key type is depicted in accordance with a preferred embodiment of the present invention. Since the retrieval process might result in an exception occurring, this process is embedded in a try routine shown in steps 700, 702, 706, and 708. The vector associated with the specified type is retrieved from the header index table (step 700). A determination is made as to whether the vector is empty (step 702). If the vector is empty, null is returned (step 704) and the procedure is exited.

If the vector is not empty, the index value of the first element is retrieved (step 706). The message header stored at that index in the vector of message headers is fetched and returned from the procedure (step 708) with the process terminating thereafter. It is possible an exception might occur due to an inability to return the first element of the vector or due to the index in the vector of messages being invalid. In either case, an error message is printed or output (step 710) and null is returned (step 704).

Figure 8:
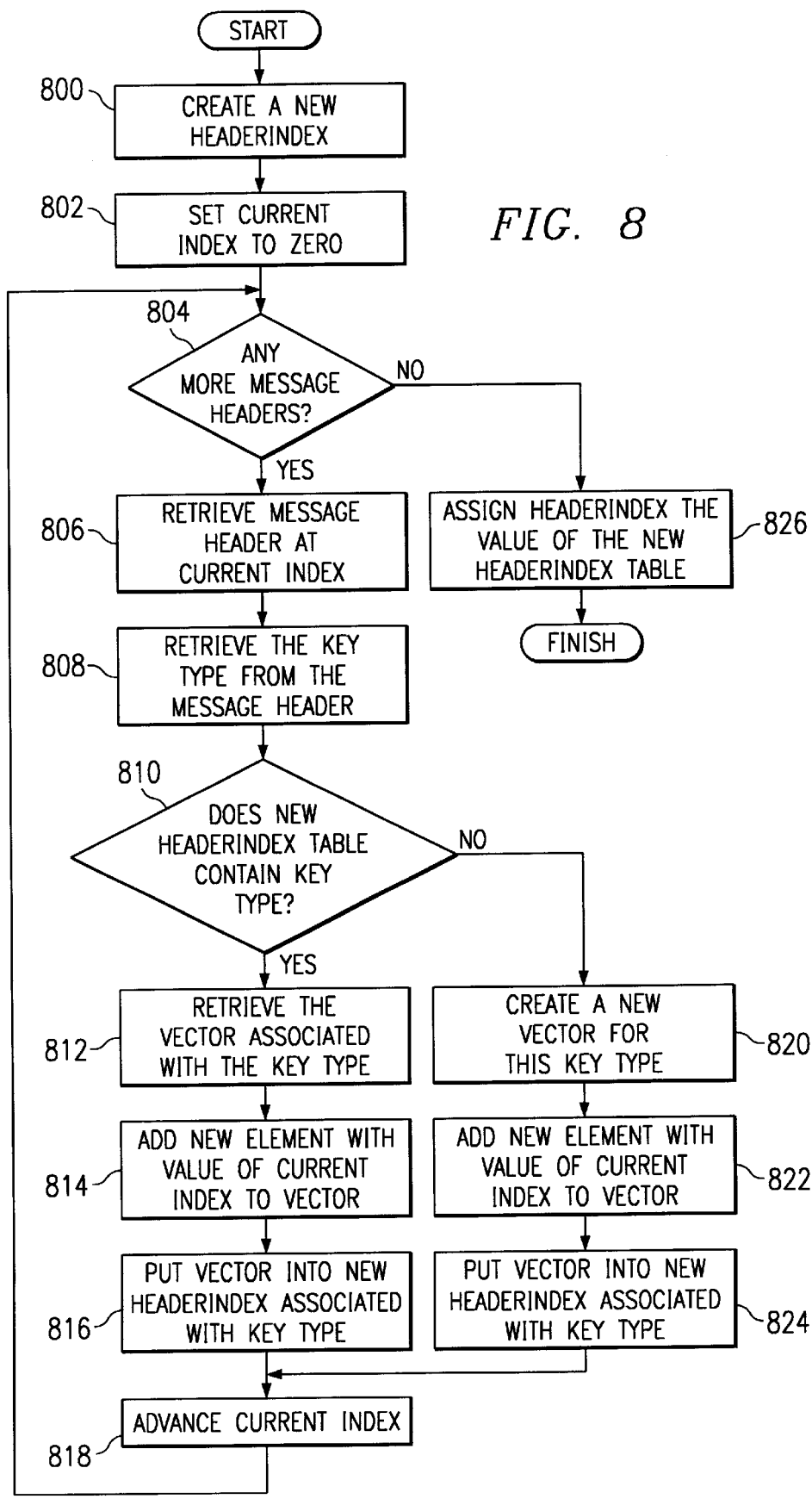
FIG. 8 is a flowchart showing the recalculation of a new header index table based on an existing vector of message headers depicted in accordance with a preferred embodiment of the present invention.

With reference now to FIG. 8, a flowchart showing the recalculation of a new header index table based on an existing vector of message headers is depicted in accordance with a preferred embodiment of the present invention. The process begins by creating a new header index hash table (step 800). This new table is empty. The basic idea is to sequentially scan through the existing message headers one-by-one, determine the key type of the current message (the key in the new header index table), either retrieve the vector associated with that key type if it already exists or create a new vector if it does not exist, and insert the message index at the end of the vector. Next, the current index value is set to zero (step 802). A determination is made as to whether more message headers are present for processing (step 804). If additional message headers are present, the message header at the current index is retrieved (step 806), and the key type for that message header is extracted (step 808).

Next, a determination is made as to whether the hash table contains a key type for the header from the message (step 810). If the key type is present in the hash table, a vector associated with that key type is present. If the key type is missing from the hash table, then no vector is present for the key type of the header from the message. If the key type is present, the vector associated with the key type is retrieved (step 812). The value of the current index is then added at the end of the vector (step 814), and the modified vector is put back into the new header index table (step 816). Then, the index is advanced or incremented (step 818) with the process then returning to step 804.

With reference again to step 810, if a key type is not present, then no vector exists for the key type. As a result, the key type and a new vector for the key type is created (step 820). The current index value is put into the vector as its first element (step 822), and the new vector is put back into the new header index table (step 824). The process proceeds to step 818 as described above.

With reference again to step 804, if no more headers are present, then the header index is assigned the value of the new header index table (step 826) and the recalculation of the table is completed.

With reference now to FIG. 9, a flowchart showing the retrieval of all message headers associated with a specified key type is depicted in accordance with a preferred embodiment of the present invention. The process begins by retrieving the vector associated with the specified type from the header index table (step 900). A determination is made as to whether the vector is empty (step 902). If the vector is empty, then null is returned (step 904) with the process then terminating.

With reference again to step 902, if the vector is not empty, then a temporary vector for holding all the message headers of the specified type is created (step 906). A determination is then made as to whether additional message headers of the same type are present for retrieval (step 910). If more message headers are present to be retrieved, the message index is retrieved from the current vector position (step 912). The message header stored at that index in the vector of message headers is fetched and stored in the temporary message header vector (step 914). Next, the position in the vector is advanced to the next position (step 916) with the process then returning to step 910. With reference again to step 910, if no more message headers are present, the temporary vector of message headers is returned (step 918) with the process terminating thereafter.

Figure 10:
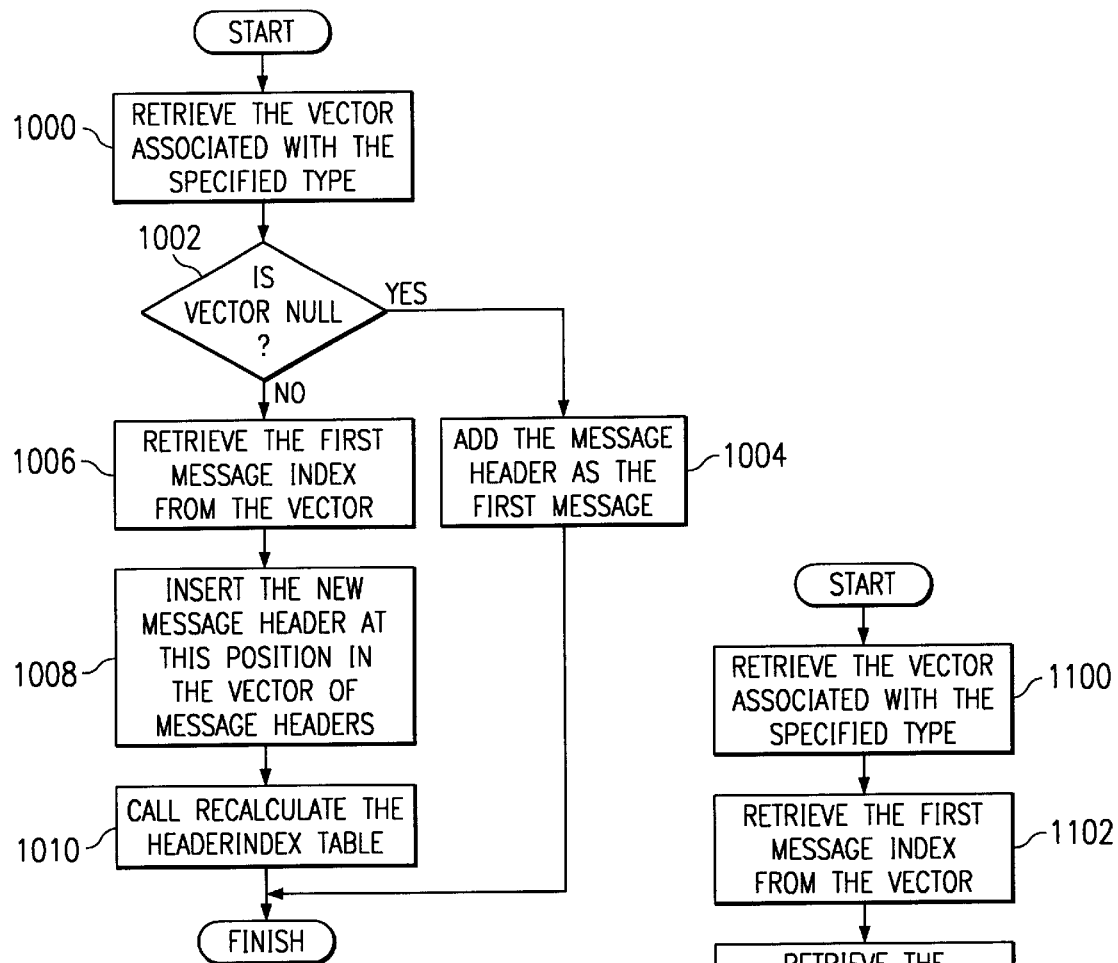
FIG. 10 is a flowchart showing the addition of a message header at the beginning of a specified key type depicted in accordance with a preferred embodiment of the present invention.

With reference now to FIG. 10, a flowchart showing the addition of a message header at the beginning of a specified key type is depicted in accordance with a preferred embodiment of the present invention. The vector associated with the specified type is retrieved from the header index table (step 1000). A determination is made as to whether the vector is empty (step 1002). If the vector is empty, then the message header is added as the first entry in the vector (step 1004) with the process terminating thereafter.

If the vector is not empty, then the index of the first message header stored in the vector is retrieved (step 1006). The message header passed in as a parameter is inserted in the vector of message headers at this position (step 1008). This insertion will cause other messages to change their index values. The header index table is then recalculated (step 1010) with the process terminating thereafter. The process to recalculate the header index is described in more detail in FIG. 8 above.

Figure 11:
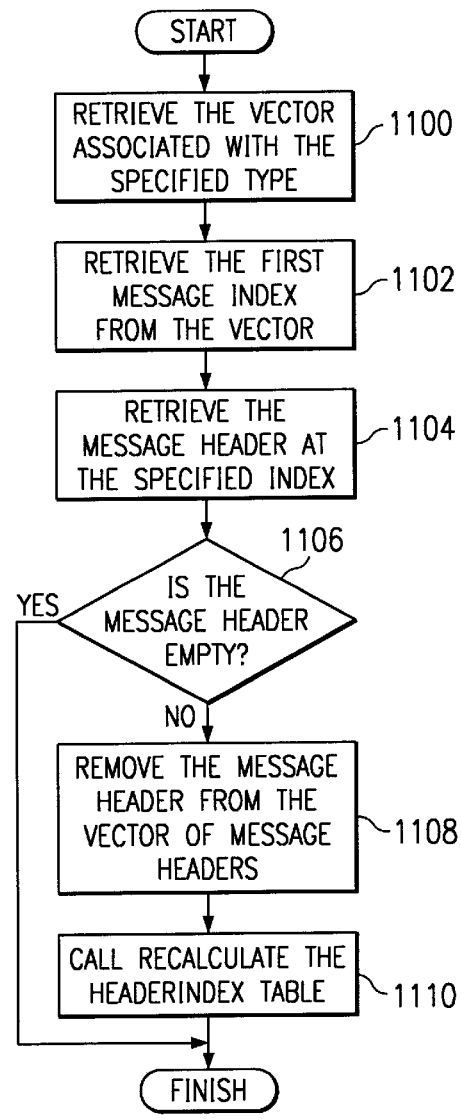
FIG. 11 is a flowchart showing the removal of the first message header of a specified key type depicted in accordance with a preferred embodiment of the present invention.

With reference now to FIG. 11, a flowchart showing the removal of the first message header of a specified key type is depicted in accordance with a preferred embodiment of the present invention. The process begins by retrieving the vector associated with the specified type from the header index table (step 1100). The first entry in the vector, an index in the vector of message headers, is retrieved (step 1102). Then, the actual message header is retrieved from the vector of message headers (step 1104).

A determination is made as to whether the message header is empty (step 1106). If the message header is empty, then the process terminates. If the message header is not empty, then the message header is removed from the vector of message headers (step 1108). Thereafter, the header index table is recalculated (step 1110). This step is performed because the removal of the message header causes other messages to change their index values. FIG. 8 illustrates a more detailed description of step 1110.

With reference now to FIGS. 12A–12D, a diagram of code for processing headers and SIP messages is depicted in accordance with a preferred embodiment of the present invention. The code is an example of an implementation of the processes shown in the flowcharts in FIGS. 6–11. The code illustrated in these figures is in Java in this example. Of course, the processes of the present invention may be implemented using other languages. The addition of a new message header is shown in section 1200 in FIG. 12A. This code corresponds to the processes in FIG. 6. The code in section 1202 in FIG. 12B provides for obtaining a message header for a specified type similar to the processes illustrated in FIG. 7. In section 1204 in FIG. 12C, this code provides for recalculation of the header index table in the hash table and corresponds to the flowchart in FIG. 8. The code in section 1206 in FIG. 12C is used to obtain all headers of a specific type and corresponds to the processes shown in FIG. 9. In section 1208 in FIG. 12D the code is used to add a header to the beginning of a header list and corresponds to the flowchart in FIG. 10. The code in section 1210 in FIG. 12D is used to remove a first header of a specified type. This code in this section is an example implementation of the processes illustrated in FIG. 11.

Although the depicted examples illustrate the parsing and storing of headers from messages, the processes of the present invention may be applied to other types of information elements parsed from a data structure. This process may be applied elsewhere other than just in SIP messages illustrated in the depicted embodiment. For example, the processes of the present invention may be applied to information or data elements in a data stream. A data stream containing audio or audio and video may be processed using the mechanism of the present invention. For example, in a Moving Pictures Experts Group (MPEG) data stream, content of one type in the data stream may be in a compressed form using one compression algorithm content of another type in the data stream may be in a compressed form using another compression algorithm. The content may be stored in the order it is received in a buffer or other data structure. The data elements making up the content may be identified or grouped by content type using a vector or other data structure to store the location of the content for a particular type. In this manner, content of one type may be quickly located when that content is to be decompressed.

Also in receiving and storing audio and video packets, the mechanism of the present invention may be used to locate packets of a particular type, such as video packets, for processing and presentation.

Further, with multiple communication sessions, events may occur requiring data packets for a session to be recombined for use. The mechanism of the present invention may be used to locate data packets for a particular session. As data packets are received for a session, the data packets may be stored in a first data structure with indexes or stored in a memory based on an address location. The location of these data packets may be stored in a second data structure containing indexes or address locations for all data packets for the same session. A set of second data structures is formed for the different sessions. A second data structure associated with a session may later be used to locate the data packets for that session without having to perform a complete search of a data structure or memory in which the data packets are stored. Also, in voice communications, one voice in a conversation may be compressed in one way while another voice in the conversation may be compressed using another algorithm. The mechanism of the present invention may be used to index and locate information for different voices to improve efficiency of processes used to decompress the voices.

With respect to receiving data streams, data or information from a data stream may be processed on the protocol for the particular type of data. As data is received, the data may be associated with the type of protocol for the type of data and the location placed in a hash table or other structure for later use in locating the data.

These processes also may be applied to digitized data in a computer system, such as speech input using a microphone and video from a video camera attached to the computer system. The data for each type of media may be received, stored, and located using the mechanism of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the figures and descriptions illustrate the processing of headers in a SIP message, the mechanism of the present invention may be applied to other elements within a data packet. Further, the mechanism of the present invention also may be applied to data streams. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing a plurality of data elements from a data packet, the method comprising:

receiving the data packet including the plurality of data elements, wherein the plurality of data elements has a plurality of types;

placing the plurality of data elements into a first data structure, wherein the plurality of data elements are located in the first data structure using index information; and storing the index information in a plurality of data structures, wherein each data structure within the plurality of data structures stores index information for data elements of a same type, wherein the plurality of data elements are a plurality of headers and wherein the plurality of headers are a plurality of Session Initiation Protocol headers.

2. A method in a data processing system for managing a plurality of data elements from a data packet, the method comprising:

receiving the data packet including the plurality of data elements, wherein the plurality of data elements has a plurality of types;

placing the plurality of data elements into a first data structure, wherein the plurality of data elements are located in the first data structure using index information; and storing the index information in a plurality of data structures, wherein each data structure within the plurality of data structures stores index information for data elements of a same type and wherein the data packet is a Session Initiation Protocol message.

3. A method in a data processing system for managing a plurality of data elements from a data packet, the method comprising:

receiving the data packet including the plurality of data elements, wherein the plurality of data elements has a plurality of types;

placing the plurality of data elements into a first data structure, wherein the plurality of data elements are located in the first data structure using index information; and storing the index information in a plurality of data structures, wherein each data structure within the plurality of data structures stores index information for data elements of a same type and wherein the plurality of data elements are located in a payload portion of the data packet.

4. A method in a data processing system for managing data elements from a received data structure, the method comprising:

parsing the data structure for data elements within the data structure;

responsive to identifying a data element, placing the data element into an array in association with an identifier, wherein the identifier is used to locate the data within the array; and responsive to placing the data element into the array in association with the identifier, placing the identifier associated with the data element into a vector, wherein the vector is an entry in a hash table located with a key, wherein the key corresponds to a data type for the data element, wherein each identifier in the vector is associated with data elements of the data type, and wherein the data elements are headers in a Session Initiation Protocol message.

5. A method in a data processing system for managing received data, the method comprising the data processing system implemented steps of:

receiving data, wherein the data has a plurality of types;

storing the data, wherein the data is accessed by an identifier; and storing identifiers for the data in a plurality of groups, wherein identifiers associated with data of a same type are stored together in a group within the plurality of groups, wherein data of the same type may be accessed using the group, and wherein the data is multimedia data, including an audio type and a video type.

6. A method in a data processing system for managing received data, the method comprising the data processing system implemented steps of:

receiving data, wherein the data has a plurality of types;

storing the data, wherein the data is accessed by an identifier; and storing identifiers for the data in a plurality of groups, wherein identifiers associated with data of a same type are stored together in a group within the plurality of groups, wherein data of the same type may be accessed using the group, wherein the data is voice data including a plurality of voices and wherein the plurality of voices corresponds to the plurality of groups.

7. A data processing system for managing a plurality of data elements from a data packet, the data processing system comprising:

receiving means for receiving the data packet including the plurality of data elements, wherein the plurality of data elements has a plurality of types;

placing means for placing the plurality of data elements into a first array, wherein the plurality of data elements are associated with a plurality of identifiers identifying a location of the plurality of data elements in the first data structure; and storing means for storing the plurality of identifiers in a plurality of data structures, wherein each data structure within the plurality of data structures stores identifiers of a same type, wherein the plurality of data elements are a plurality of headers and wherein the plurality of headers are a plurality of Session Initiation Protocol headers.

8. A data processing system for managing a plurality of data elements from a data packet, the data processing system comprising:

receiving means for receiving the data packet including the plurality of data elements, wherein the plurality of data elements has a plurality of types;

placing means for placing the plurality of data elements into a first array, wherein the plurality of data elements are associated with a plurality of identifiers identifying a location of the plurality of data elements in the first data structure; and storing means for storing the plurality of identifiers in a plurality of data structures, wherein each data structure within the plurality of data structures stores identifiers of a same type and wherein the data packet is a Session Initiation Protocol message.

9. A data processing system for managing a plurality of data elements from a data packet, the data processing system comprising:

receiving means for receiving the data packet including the plurality of data elements, wherein the plurality of data elements has a plurality of types;

placing means for placing the plurality of data elements into a first array, wherein the plurality of data elements are associated with a plurality of identifiers identifying a location of the plurality of data elements in the first data structure; and storing means for storing the plurality of identifiers in a plurality of data structures, wherein each data structure within the plurality of data structures stores identifiers of a same type and wherein the plurality of data elements are located in a payload portion of the data packet.

10. A data processing system for managing data elements from a received data structure, the data processing system comprising:

parsing means for parsing the data structure for data elements within the data structure;

first placing means, responsive to identifying a data element, for placing the data element in an array, wherein an identifier is used locating the data within the array; and second placing means, responsive to identifying the data element, for placing the identifier of the data element in a vector, wherein the vector is an entry in a hash table located with a key, wherein the key corresponds to a data type for the data element, wherein each identifier in the vector identifies data elements of the data type in the data structure, and wherein the data elements are headers in a Session Initiation Protocol message.

11. A data processing system for managing received data, the data processing system comprising:

receiving means for receiving data, wherein the data has a plurality of types;

first storing means for storing the data, wherein the data is accessed by an identifier; and second storing means for storing identifiers for the data in a plurality of groups, wherein identifiers associated with data of a same type are stored together in a group within the plurality of groups, wherein data of the same type may be accessed using the group, and wherein the data is multimedia data, including an audio type and a video type.

12. A data processing system for managing received data, the data processing system comprising:

receiving means for receiving data, wherein the data has a plurality of types;

first storing means for storing the data, wherein the data is accessed by an identifier; and second storing means for storing identifiers for the data in a plurality of groups, wherein identifiers associated with data of a same type are stored together in a group within the plurality of groups, wherein data of the same type may be accessed using the group, wherein the data is voice data including a plurality of voices and wherein the plurality of voices corresponds to the plurality of groups.

13. A method comprising:

parsing a data packet, wherein the data packet includes data elements, wherein each of the data elements has an associated type, and wherein the data elements are parsed in a particular order;

associating each of the data elements with an index value, wherein the index value for each data element is determined by the particular order in which the data elements are parsed;

storing each of the data elements in a first data structure, wherein the data elements are indexed within the first data structure by the index value of each of the data elements;

storing the index value of each data element in a second data structure, wherein the second data structure is indexed by the associated type of each of the data elements such that the second data structure maps the associated type of each of the data elements into the index values that correspond to the data elements.

14. The method of claim 13, wherein the first data structure is an array.

15. The method of claim 13, wherein the index value of each of the data elements is an array index in the array.

16. The method of claim 13, wherein the first data structure is a vector.

17. The method of claim 13, wherein the data elements are headers.

18. The method of claim 13, wherein the second data structure includes a hash table, and wherein the associated type of each of the data elements is a key in the hash table.

19. The method of claim 18, wherein the hash table maps each the associated type of each of the data elements into a sequential data structure containing index values of data elements having the associated type.

20. The method of claim 19, wherein the sequential data structure is a vector.

21. The method of claim 13, further comprising:
in response to a request for data elements having a particular associated type, retrieving from the second data structure a set of index values corresponding to the data elements having the particular associated type.

22. The method of claim 21, further comprising:
using the set of index values to retrieve from the first data structure the data elements having the particular associated type.

23. A computer program product in a computer-readable medium comprising functional descriptive material that, when executed by a computer, enables the computer to perform acts including:
parsing a data packet, wherein the data packet includes data elements, wherein each of the data elements has an associated type, and wherein the data elements are parsed in a particular order;
associating each of the data elements with an index value, wherein the index value for each data element is determined by the particular order in which the data elements are parsed;
storing each of the data elements in a first data structure, wherein the data elements are indexed within the first data structure by the index value of each data element;
storing the index value of each data element in a second data structure, wherein the second data structure is indexed by the associated type of each of the data elements such that the second data structure maps the associated type of each of the data elements into the index values that correspond to the data elements.

24. The computer program product of claim 23, wherein the first data structure is an array.

25. The computer program product of claim 23, wherein the index value of each of the data elements is an array index in the array.

26. The computer program product of claim 23, wherein the first data structure is a vector.

27. The computer program product of claim 23, wherein the data elements are headers.

28. The computer program product of claim 23, wherein the second data structure includes a hash table, and wherein the associated type of each of the data elements is a key in the hash table.

29. The computer program product of claim 28, wherein the hash table maps each the associated type of each of the data elements into a sequential data structure containing index values of data elements having the associated type.

30. The computer program product of claim 29, wherein the sequential data structure is a vector.

31. The data processing system of claim 30, wherein the sequential data structure is a vector.

32. The data processing system of claim 29, wherein the hash table maps each the associated type of each of the data elements into a sequential data structure containing index values of data elements having the associated type.

33. The computer program product of claim 23, comprising additional functional descriptive data that, when executed by the computer, enables the computer to perform additional acts, including:
in response to a request for data elements having a particular associated type, retrieving from the second data structure a set of index values corresponding to the data elements having the particular associated type.

34. The computer program product of claim 33, comprising additional functional descriptive data that, when executed by the computer, enables the computer to perform additional acts, including:
using the set of index values to retrieve from the first data structure the data elements having the particular associated type.

35. The data processing system of claim 34, further comprising:
means for using the set of index values to retrieve from the first data structure the data elements having the particular associated type.

36. The data processing system of claim 23, wherein the first data structure is an array.

37. The data processing system of claim 23, wherein the index value of each of the data elements is an array index in the array.

38. The data processing system of claim 23, wherein the data elements are headers.

39. The data processing system of claim 23, wherein the second data structure includes a hash table, and wherein the associated type of each of the data elements is a key in the hash table.

40. The data processing system of claim 23, further comprising:
means, responsive to a request for data elements having a particular associated type, for retrieving from the second data structure a set of index values corresponding to the data elements having the particular associated type.

41. A data processing comprising:
means for parsing a data packet, wherein the data packet includes data elements, wherein each of the data elements has an associated type, and wherein the data elements are parsed in a particular order;
means for associating each of the data elements with an index value, wherein the index value for each data element is determined by the particular order in which the data elements are parsed;
means for storing each of the data elements in a first data structure, wherein the data elements are indexed within the first data structure by the index value of each data element;
means for storing the index value of each data element in a second data structure, wherein the second data structure is indexed by the associated type of each of the data elements such that the second data structure maps the associated type of each of the data elements into the index values that correspond to the data elements.

* * * * *